3,510,422
COMPOSITE SILICATE-ZEOLITE CATALYST
Edward L. Cole, Fishkill, Edwin C. Knowles, Poughkeepsie, and Eugene E. Sensel, Beacon, N.Y., assignors to Texaco Inc., New York, N.Y., a corporation of Delaware
No Drawing. Filed Sept. 11, 1967, Ser. No. 666,940
Int. Cl. C10g 11/02; B01 11/40
U.S. Cl. 208—120                                   15 Claims

ABSTRACT OF THE DISCLOSURE

The catalysts are composed of crystalline aluminosilicate zeolites in a lamellar nickel, cobalt or magnesium silicate matrix. The composition is prepared from metal silicate gels having high silica ratios by reacting the gel with a source of alumina and alkali thereby forming the zeolite, in situ, within the gel. The catalytic properties of the composition render it particularly applicable in numerous hydrocarbon conversion processes including hydrocracking, catalytic cracking, hydrofining and isomerization.

---

This invention relates to the catalytic conversion of hydrocarbons. In particular, this invention relates to the catalytic conversion of hydrocarbons in the presence of a new and improved catalyst.

Synthetic crystalline zeolitic aluminosilicates constitute well-known materials which have heretofore been employed as selective adsorbents, carriers and catalysts. In general, such crystalline materials have been grown under designated conditions of temperature and time from nutrients as, for example, alkali oxides, aluminum oxide, silica and water. The synthesis of such materials has provided finely divided crystalline powders in the order of approximately a few to 10 microns which present design and construction difficulties in processes employing the same. To overcome such difficulties as high pressure drops through fixed beds of crystalline material and low attrition resistance and crush strength, the art has suggested larger crystalline bodies in the form of agglomerates to facilitate handling of the material. Various agglomerating materials or binders have been suggested including clays, silica gel, alumina gel, carbon, graphite and plastics.

Although such agglomerates have provided larger zeolitic bodies leading to easier handling and processing, these binders have at the same time diminished or interfered with the adsorptive and/or catalytic properties of the zeolite. Further, such binders supply none of the desirable properties of the zeolite itself. For example, where equal portions of a binder, such as kaolin, and a zeolite are mixed, pelletized, ion exchanged, activated and employed as catalyst in a hydrocarbon conversion process, space velocities must be reduced up to 50% and over to secure equal levels of conversion when compared to binder free catalytically active zeolites. From a processing viewpoint, lower space velocities not only curtail efficiency and production but promote undesirable side reactions through longer residence times.

It is, therefore, an object of this invention to provide a novel silicate-zeolite composition having improved catalytic and/or adsorptive properties.

Another object of this invention is to provide a method for preparing such silicate-zeolite compositions.

Yet another object of this invention is to provide a process for the conversion of hydrocarbons employing a silicate-zeolite composition as catalysts therefor.

Other objects and advantages will become apparent from the reading of the following description and examples.

Broadly, this invention contemplates a silicate-zeolite composition comprising a crystalline aluminosilicate zeolite in a lamellar metal silicate matrix.

In another embodiment this invention contemplates a method for preparing a silicate-zeolite composition which comprises reacting a metal hydrosilicate having a lamellar structure with an aqueous mixture containing a source of an alkali oxide and alumina.

In a highly preferred embodiment this invention contemplates a process for the conversion of a hydrocarbon charge which comprises contacting the charge under catalytic conversion conditions with a catalytic composition comprising a crystalline aluminosilicate zeolite in a lamellar metal silicate matrix.

The contemplated metal silicate matrix is a lamellar material having a structure resembling kaolin or montmorillonite. Among the applicable metal constituents we mention nickel, cobalt and magnesium, the preferred metal being nickel. The silicate matrices are prepared by intimately mixing and reacting in an aqueous medium an alkali silicate, such as sodium metasilicate and a compound of nickel, cobalt or magnesium, such as the acetate, nitrate, halide, sulfate or hydroxide, under hydrothermal conditions at temperatures ranging from 240 to 600° F. To obtain the instant silicates the atomic ratio of the desired metal to silicon ranges from about 3:1 to 0.5:1. Lower ratios result in appreciable amounts of free silica whereas higher ratios result in quantities of undesirable metal hydroxides such as $Ni(OH)_2$. The metal silicates thus formed are believed to correspond to the formula:

$$xMeO \cdot ySiO_2 \cdot nH_2O$$

where Me represents the designated metal, $x$ is from 2 to 4, and preferably 3, $y$ is from 1 to 6, preferably 1.5 to 4.5, and $n$ is from 0 to 10.

Subsequent to the hydrothermal treatment, the metal silicate in a gel-like form and having a solids content varying from 10 to 25%, the remainder being water, is intimately mixed with a nutrient composition composed of a source of alumina such as sodium aluminate, gibbsite, böhmite, hydroxy aluminates; an alkali such as alkali metal hydroxides including sodium, potassium or lithium hydroxide or an alkaline earth hydroxide such as calcium and magnesium or mixtures thereof, and water such that the mole ratio of the blended reactants, that is, the silicate and nutrient composition falls within:

$Na_2O/SiO_2 = 0.1-5.0$
$SiO_2/Al_2O_3 = 1.0-25.0$
$H_2O/Na_2O = 10-200$ or above where Na is expressly intended to represent each of the above alkali and alkaline earth metals.

The blended silicate and nutrients are thereafter hydrothermally treated for extended periods of time ranging from 2 hours to a week or longer at temperatures ranging from 80 to 560° F. The resulting composite silicate-zeolite consists of a silicate matrix containing from 5 to 60 and preferably from 10 to 50% zeolite. Depending on the ratio of nutrients and metal silicate, the zeolite so formed may be of any of the following: E, Z, Q, M, F, B, H, J, W, R, S, K–G, A, T, C, philipsite, analcime, chabazite, gmelinite, erionite, X, Y, faujasite, mordenite and clinoptilolite.

In another aspect of this invention, the zeolite crystal growth may be accelerated by seeding the blended silicate and nutrient mixture with a minor amount of zeolite, for example commercial grade, particularly of the type desired in the final hydrosilicate matrix.

In a highly preferred embodiment the originally synthesized zeolite is subsequently ion exchanged to give highly active catalytic composites suitable for hydrocracking, catalytic cracking, hydrofining of lubricating oils combination selective cracking of paraffins and desulfurization of light paraffinic distillates, isomerization-desulfurization of mixed n-pentane n-hexane fractions and hydrofinishing of lube oils. The composite may in fact be dual functional by the use of a selected silicate hydrate in conjunction with an ion exchanged zeolite. Among the various materials contemplated as a partial or total exchange for the alkali or alkaline earth metal we mention cobalt, nickel, zinc, magnesium, calcium, cadmium, copper, barium, platinum, palladium, rhodium, silver, tungsten, molybdenum or combinations thereof. Similarly, ion exchanging is contemplated with rare earth metals. Exchanging with ammonium hydroxide or an ammonium salt solution along with subsequent heating renders the zeolite to the corresponding hydrogen form. The zeolitic material may contain the exchanged materials as metals, oxides, sulfides, or as salts, including inorganic or organic, such as phosphates, nitrates, carbonates, oxalates, formates and combinations thereof. In place of or in addition to ion exchanging, the composite may be impregnated with any of the aforementioned exchanging materials.

By employing the selected metal silicate as a binder or matrix in conjunction with the zeolitic material, both constituents render particular catalytic properties to the system thereby making it dual or multiple functional. For example, where the zeolite mordenite is present in a nickel hydrosilicate matrix the resulting catalyst possesses cracking-dehydrogenation and desulfurization features. Illustrations of other dual functional catalysts include palladium exchanged mordenite in a cobalt hydrosilicate matrix suitable for reducing both the sulfur and paraffin content of sour West Texas light distillates; and the conversion of petroleum distillates over a structure comprising mixed low sodium zeolite X ion exchanged with rhodium in a nickel hydrosilicate matrix that showed good tolerance for nitrogen compounds in hydrocracking and denitrification reactions.

The following examples further illustrate our invention.

EXAMPLE I 0.62 mole of $NiCl_2 \cdot 6H_2O$ was converted to nickel hydroxide and freed of chloride ion by water washing. The wet hydroxide (91.2% water) was mixed with 176 grams of sodium silicate solution (28.2% silica). The resulting gel was placed in a zirconium cup in an autoclave containing 100 mls. of water and was hydrothermally heated for 72 hours at 408° F. A nickel hydrosilicate having a clay-like structure and a calculated composition of $3NiO \cdot 4SiO_2$ was obtained.

47 grams of the nickel hydrosilicate (21.3% solids) was blended with 3.7 grams of sodium aluminate, 0.3 gram of sodium hydroxide and 22 grams of distilled water, such that the blended composition had the following ratios of material:

$SiO_2/Al_2O_3 = 4$
$Na_2O/SiO_2 = 0.6$
$H_2O/Na_2O = 200$

The blend was aged in a closed container for 72 hours at 78 to 80° F. and then at 210° F. for 24 hours. The gel was cooled, filtered and the cake washed with five 40 ml. portions of distilled water. A final clear filtrate having a pH of 10 was obtained. The cake was dried on a steam plate and then at 250° F. for one hour.

X-ray diffraction analysis showed that the nickel hydrosilicate was converted in large part to a sodium Zeolite A.

EXAMPLE II

Solutions containing 122 grams of $MgCl_2 \cdot 6H_2O$ dissolved in 200 mls. of water and 227 grams of $$Na_2SiO_3 \cdot 9H_2O$$

dissolved in 450 mls. of water were mixed, placed in a glass-lined autoclave and heat sealed at 400° F. for 68 hours. The resulting product, calculated to be $$3MgO \cdot 4SiO_2$$

was washed substantially free of chloride ion. X-ray spacings confirmed the clay-like magnesium silicate hydrate structure. 100 grams of the gel, having a solids content of 11.7% was blended with 6.1 grams of sodium aluminate, 3 grams of sodium hydroxide and 60 mls. of water, such that the molar ratio of the reactants were as follows:

$Na_2O/SiO_2 = 1.45$
$SiO_2/Al_2O_3 = 2.33$
$H_2O/Na_2O = 88$

This blend was placed in a closed container and held for 72 hours at 80° F. and thereafter for 24 hours at 210° F. The blend was filtered and the cake washed with five 50 mls. portions of water. The cake was dried on a steam plate and thereafter for one-half hour at 250° F.

X-ray diffraction analysis showed that the magnesium hydrosilicate was converted in large part to sodium Zeolite C.

EXAMPLE III 237.7 grams of $NiCl_2 \cdot 6H_2O$ in 400 mls. of water was mixed with 294.2 grams of sodium silicate and 600 mls. of water. After adding an additional 100 mls. of water the blend was placed in a glass-lined autoclave and heated for 68 hours at 400° F. The blend was thereafter cooled and 1576 grams of gel was recovered. The gel was washed with a total 4500 mls. of water. A solution consisting of 18.7 grams of sodium aluminate, 31.6 grams of sodium hydroxide and 200 mls. of water were mixed with the above gel and held in a sealed vessel at 80° F. for 72 hours and thereafter for 24 hours at 210° F. After cooling, 1243 grams of gel were recovered and washed with five 300 mls. portions of water. X-ray diffraction analysis showed that the nickel hydrosilicate was converted in large part to sodium Zeolite C.

The gel was then washed with two 2000 mls. portions of water containing 10 grams of ammonium chloride per 1000 mls. The gel was filtered and dried at 250° F. for one hour. To further reduce the sodium content, 47 grams of the material was slurried with 500 mls. of a 1% HCl solution, settled, filtered and the cake washed with two 250 mls. portions of 1% HCl. The cake was thereafter water washed until freed of chloride ion.

23 grams of the powdered cake was placed in a ½ inch diameter stainless steel tube. With hydrogen flowing at the rate of 1 liter per hour, the catalyst bed was heated to 600° F. and held at this temperature for 4 hours. Hydrogen was thereafter discontinued and in place thereof isooctane was fed through the reaction zone at 753° F. with a time on test of 65 minutes. A total charge of 25.9 grams of isooctane was permitted to pass through the bed which resulted in a product of 14 grams of 98.2% isooctane and the remainder being a gaseous product consisting of 67.5 mole percent hydrogen, 19.1 mole percent $C_1$, 1.2 mole percent $C_2$, 2.1 mole percent $C_3$, 7.4 mole percent $C_4$ and 2.6 mole percent $C_5$. The conversion on a weight percent basis was 45.8.

EXAMPLE IV 237.7 grams of $CoCl_2 \cdot 6H_2O$ dissolved in 200 mls. of water and 378.9 of sodium metasilicate dissolved in 400 mls. of water were mixed. A heavy gel was secured and 150 mls. of water was added to thin the gel. The gel was placed in a glass-lined autoclave, heated to 405° F. and held at this temperature for 68 hours. The autoclave was thereafter cooled and 1278 grams of gel was recovered which was washed with a total of 7500 mls. of water. 960 grams of wet cake was recovered.

74.4 grams of sodium aluminate was placed in solution with 200 mls. of water and mixed with 24.8 grams of sodium hydroxide and 100 mls. of water. This solution and the cake were thereafter mixed and placed in a closed container and held at 80° F. for 72 hours and thereafter at 210° F. for 24 hours. After cooling and recovering the gel, the gel was washed with four 150 ml. portions of water and thereafter dried at 250° F. X-ray diffraction analysis showed a type C zeolite present in a matrix of lamellar clay-like cobalt hydrosilicate.

EXAMPLE V 122 grams of $MgCl_2 \cdot 6H_2O$ were dissolved in 200 mls. of water and 227 grams of sodium silicate were dissolved in 400 mls. of water. After mixing the two solutions a heavy white slurry was recovered. The slurry was then placed in a glass-lined autoclave, which had been purged with nitrogen, and was heated to 400° F. Thereafter, 95.3 grams of product was recovered and washed with a total of 22.8 liters of water until the gel was substantially free of chloride ion.

179 grams of the gel, calculated to contain 12 grams of uncombined $SiO_2$ (0.20 mole), was added to 3.3 grams of sodium aluminate in 400 mls. of water. After mixing the blend was placed in a stainless steel autoclave and heated to 535° F. for 18 hours. After cooling and washing until the filtrate had a pH of approximately 9, a small portion of the material was dried and upon X-ray diffraction analysis revealed that the magnesium hydrosilicate was in large part converted to anaclime.

EXAMPLE VI

The gel of the preceding example was mixed with 500 mls. of 2 percent HCl and allowed to settle overnight and was thereafter decanted and filtered. Four additional portions of 500 mls. of HCl were used to wash and the filtering procedure was repeated as above. After washing with 500 mls. of water, X-ray diffraction analysis revealed the material to be magnesium hydrosilicate having contained in its matrix analcime. The sodium content was 0.14%.

EXAMPLE VII 10 grams of the material in powdered form from the preceding example was placed in a ½ inch diameter stainless steel fluidization tube, the fluidization section comprising approximately 6 inches in length. Hydrogen was fed through the tube at a rate of 1 liter per hour and the bed was heated to 750° F. and with hydrogen flowing was held at 750° F. for 4 hours. Isooctane was thereafter introduced through the fluidization section under the following conditions: reaction temperature ° F. 802; time in minutes—60; the charge in mls.—39; the charge in grams—27.3; liquid product in grams—24.0; liquid v./v./ hour—3.9; 14 weight percent of isooctane was cracked to lower molecular weight hydrocarbons.

We claim:

1. A silicate-zeolite composition comprising a crystalline aluminosilicate zeolite in a lamellar metal silicate matrix wherein said metal of said metal silicate is selected from the group consisting of nickel, cobalt and magnesium.

2. A composition according to claim 1 wherein said matrix is catalytically active.

3. A composition according to claim 1 wherein said zeolite is base exchanged with a catalytically active ion.

4. A composition according to claim 1 wherein said zeolite comprises from 5 to 60 percent of said composition.

5. A method for preparing a silicate-zeolite composition which comprises:

(a) reacting in an aqueous medium an alkali silicate with a compound of a metal selected from the group consisting of nickel, cobalt and magnesium, where the atomic ratio of said metal to silicon is from about 0.5/3 to 1, to produce a metal silicate gel; and (b) reacting said metal silicate gel with a nutrient composition comprising a source of alumina and a hydroxide of a metal selected from the group consisting of alkali and alkaline earth metals, thereby producing, in situ, a crystalline alumino-silicate zeolite in a matrix of said metal silicate.

6. A method according to claim 5 wherein step (a) is conducted at a temperature ranging from about 240 to 600° F.

7. A method according to claim 5 wherein step (b) is conducted at a temperature ranging from about 80 to 560° F.

8. A method according to claim 5 wherein said zeolite formed in situ in step (b) is base exchanged with a catalytically active ion.

9. A method according to claim 5 wherein said gel in step (b) has a solids content of from 10 to 25 percent.

10. A method according to claim 5 wherein the mole ratio of said metal silicate and nutrient composition falls within the following:

| | |
|---|---|
| $Na_2O/SiO_2$ | 0.1–5.0 |
| $SiO_2/Al_2O_3$ | 1.0–25.0 |
| $H_2O/Na_2O$ | at least 10 |

11. A method according to claim 5 wherein step (6) is conducted in the presence of a minor amount of a zeolite.

12. A method according to claim 5 wherein said source of alumina is sodium aluminate.

13. A process for the conversion of hydrocarbons which comprises contacting a hydrocarbon charge under conversion conditions with a catalytic composition comprising a crystalline aluminosilicate zeolite in a lamellar metal silicate matrix wherein said metal of said metal silicate is selected from the group consisting of nickel, cobalt and magnesium.

14. A process for the conversion of hydrocarbons according to claim 13 wherein said zeolite is base exchanged with a catalytically active cation.

15. A process for the conversion of hydrocarbons according to claim 13 wherein said zeolite comprises from 5 to 60 percent of said composition.

References Cited

UNITED STATES PATENTS

| | | | |
|---|---|---|---|
| 2,500,197 | 3/1950 | Michael et al. | 252—451 X |
| 3,140,253 | 7/1964 | Plank et al. | 208—120 |
| 3,244,643 | 4/1966 | Schwartz | 252—455 |
| 3,321,272 | 5/1967 | Kerr | 252—455 X |
| 3,341,284 | 9/1967 | Young | 252—455 |
| 3,365,272 | 1/1968 | Cornelius et al. | 23—113 |

FOREIGN PATENTS 1,463,444  11/1966  France.

DANIEL E. WYMAN, Primary Examiner

C. F. DEES, Assistant Examiner

U.S. Cl. X.R.

252—451, 455, 457, 459